United States Patent [19]
LeMense

[11] Patent Number: 5,783,871
[45] Date of Patent: Jul. 21, 1998

[54] APPARATUS AND METHOD FOR SENSING A REARWARD FACING CHILD SEAT

[75] Inventor: Thomas John LeMense, Livonia, Mich.

[73] Assignee: TRW Inc., Lyndhurst, Ohio

[21] Appl. No.: 719,267

[22] Filed: Sep. 24, 1996

[51] Int. Cl.⁶ ............................................. B60R 21/00
[52] U.S. Cl. ...................... 307/10.1; 180/282; 280/735
[58] Field of Search ................................ 307/9.1, 10.1; 364/424.037, 424.045, 424.055–424.057; 180/167, 268, 271, 287, 282; 280/735, 734; 235/493, 128, 382, 382.5; 340/436, 669, 438, 440, 825.3–825.32, 825.34, 825.72, 825.54; 342/42, 51

[56] References Cited

U.S. PATENT DOCUMENTS

| | | |
|---|---|---|
| 3,172,684 | 3/1965 | Isaac . |
| 3,340,523 | 9/1967 | Whitman . |
| 3,460,139 | 8/1969 | Rittenbach . |
| 3,672,699 | 6/1972 | De Windt . |
| 3,798,642 | 3/1974 | Augenblick et al. . |
| 3,992,028 | 11/1976 | Abe et al. . |
| 4,004,234 | 1/1977 | Juvinall . |
| 4,063,230 | 12/1977 | Purinton et al. . |
| 4,336,531 | 6/1982 | Kincaid . |
| 4,502,042 | 2/1985 | Wuhrl et al. . |
| 4,510,489 | 4/1985 | Anderson, III et al. . |
| 4,553,136 | 11/1985 | Anderson, III et al. . |
| 4,622,543 | 11/1986 | Anderson, III et al. . |
| 4,633,250 | 12/1986 | Anderson, III et al. . |
| 4,644,286 | 2/1987 | Torre . |
| 4,647,910 | 3/1987 | Torre . |
| 4,647,917 | 3/1987 | Anderson, III et al. . |
| 4,658,241 | 4/1987 | Torre . |
| 4,658,263 | 4/1987 | Urbanski . |
| 4,675,655 | 6/1987 | Anderson et al. . |
| 4,675,658 | 6/1987 | Anderson et al. . |
| 4,683,461 | 7/1987 | Torre . |
| 4,746,830 | 5/1988 | Holland . |
| 4,796,013 | 1/1989 | Yasuda et al. . |
| 4,804,859 | 2/1989 | Swart . |
| 4,812,811 | 3/1989 | Asbrink et al. . |
| 4,842,301 | 6/1989 | Feldmaier . |
| 4,868,915 | 9/1989 | Anderson, III et al. . |

(List continued on next page.)

FOREIGN PATENT DOCUMENTS

| | | |
|---|---|---|
| 458102 | 11/1991 | European Pat. Off. . |
| 3802159 | 8/1989 | Germany . |
| 4212018 | 10/1992 | Germany . |
| 4228624 | 3/1994 | Germany . |
| 4410402 | 9/1994 | Germany . |
| 2287859 | 9/1995 | United Kingdom . |

OTHER PUBLICATIONS

Research Disclosure, Dec. 1992, No. 344, Disclosure 34457.
Research Disclosure Nov. 1993, No. 355, Disclosure 35519.
Automotive Occupant Sensor by Gencorp. AeroJet (Date Unknown).

*Primary Examiner*—Richard T. Elms
*Attorney, Agent, or Firm*—Tarolli, Sundheim, Covell, Tummino & Szabo

[57] ABSTRACT

An apparatus (32) senses the presence of a rearward facing child restraint seat (34) in a vehicle. A frequency oscillator (80) is used to provide an electrical transmit signal which is applied to an antenna (60). The antenna (60) transmits an electromagnetic (EM) signal (62) which has a frequency and a time duration. An identification tag (54) is securable to the child restraint seat (34) and provides an EM return signal (64) in response to the EM transmit signal (62). The EM return signal (64) has the same frequency as the EM transmit signal (62) and continues past the EM transmit signal. The antenna (60) receives the EM return signal (64) and provides an electrical return signal in response to the EM return signal. A product detector (100) is coupled to receive both the electrical transmit signal and the electrical receive signal for determining the presence of the identification tag (54).

21 Claims, 2 Drawing Sheets

U.S. PATENT DOCUMENTS

| | | |
|---|---|---|
| 4,973,944 | 11/1990 | Maletta . |
| 5,071,160 | 12/1991 | White et al. . |
| 5,074,583 | 12/1991 | Fujita et al. . |
| 5,081,446 | 1/1992 | Gill et al. . |
| 5,103,222 | 4/1992 | Esch et al. . |
| 5,118,134 | 6/1992 | Mattes et al. . |
| 5,161,820 | 11/1992 | Vollmer . |
| 5,218,343 | 6/1993 | Stobbe et al. . |
| 5,232,243 | 8/1993 | Blackburn et al. . |
| 5,239,696 | 8/1993 | Balch et al. . |
| 5,260,684 | 11/1993 | Metzmaker . |
| 5,414,410 | 5/1995 | Davies et al. . |
| 5,605,348 | 2/1997 | Blackburn et al. ............... 280/735 |

5,783,871

APPARATUS AND METHOD FOR SENSING A REARWARD FACING CHILD SEAT

TECHNICAL FIELD

The present invention is directed to a vehicle occupant restraint system and is specifically directed to an apparatus for sensing the presence of a rearward facing child restraint seat on a vehicle seat of a vehicle. The apparatus can be used for preventing deployment of an air bag restraint when the child restraint seat is secured to the associated vehicle seat and is positioned in the rearward facing direction.

BACKGROUND OF THE INVENTION

Air bag restraint systems for vehicles are well known in the art. It is also known to prevent deployment of an air bag during a vehicle collision when the air bag is associated with a seat location that is unoccupied. Deployment of an air bag associated with an unoccupied seat location (typically the passenger seat location) during a vehicle collision adds unnecessary expense to the repair of the vehicle.

To prevent such unnecessary deployment of an air bag at an unoccupied seat location, sensors are provided to detect the presence of an occupant on a vehicle seat. These sensors include pressure sensing switches located in the seat cushion and/or infrared or ultrasonic sensors located in the vehicle dashboard or instrument panel. If no occupant is detected as being present on the seat, deployment of the associated air bag during a vehicle collision is prevented through an appropriate control arrangement.

It is also desirable to prevent deployment of an air bag when a child restraint seat is secured in a rearward facing direction on the vehicle seat associated with the air bag.

SUMMARY OF THE INVENTION

The present invention provides an apparatus and method for sensing the presence of an object and, in particular, a rearward facing child restraint seat. The object has secured thereon identifier means providing an electromagnetic identifier return signal in response to a transmitted electromagnetic signal.

Transmitter means of the apparatus provides a transmitted electromagnetic signal which has a frequency and a time duration. The transmitted electromagnetic signal from the transmitter means causes the identifier means to provide the electromagnetic identifier return signal. The electromagnetic identifier return signal has substantially the same frequency as the transmitted electromagnetic signal and continues in duration beyond the transmitted electromagnetic signal. Receiver means receives the electromagnetic identifier return signal. Processor means coupled to receive inputs from the transmitter means and the receiver means determines the presence of the identifier means when the receiver means receives the electromagnetic identifier return signal.

The method includes securing the identifier means to the object and transmitting an electromagnetic signal having a frequency and duration. The electromagnetic identifier return signal is provided by the identifier means in response to the transmitted electromagnetic signal, and the electromagnetic identifier return signal has substantially the same frequency as, and continues in time past the transmitted electromagnetic signal. The electromagnetic identifier return signal is received and processed using the transmitted electromagnetic signal. The presence of the identifier means is determined in response to the processed electromagnetic identifier return signal.

BRIEF DESCRIPTION OF THE DRAWINGS

Further features of the present invention will become apparent to those skilled in the art to which the present invention relates from reading the following description with reference to the accompanying drawings, in which.

DESCRIPTION OF PREFERRED EMBODIMENT

Figure 1:
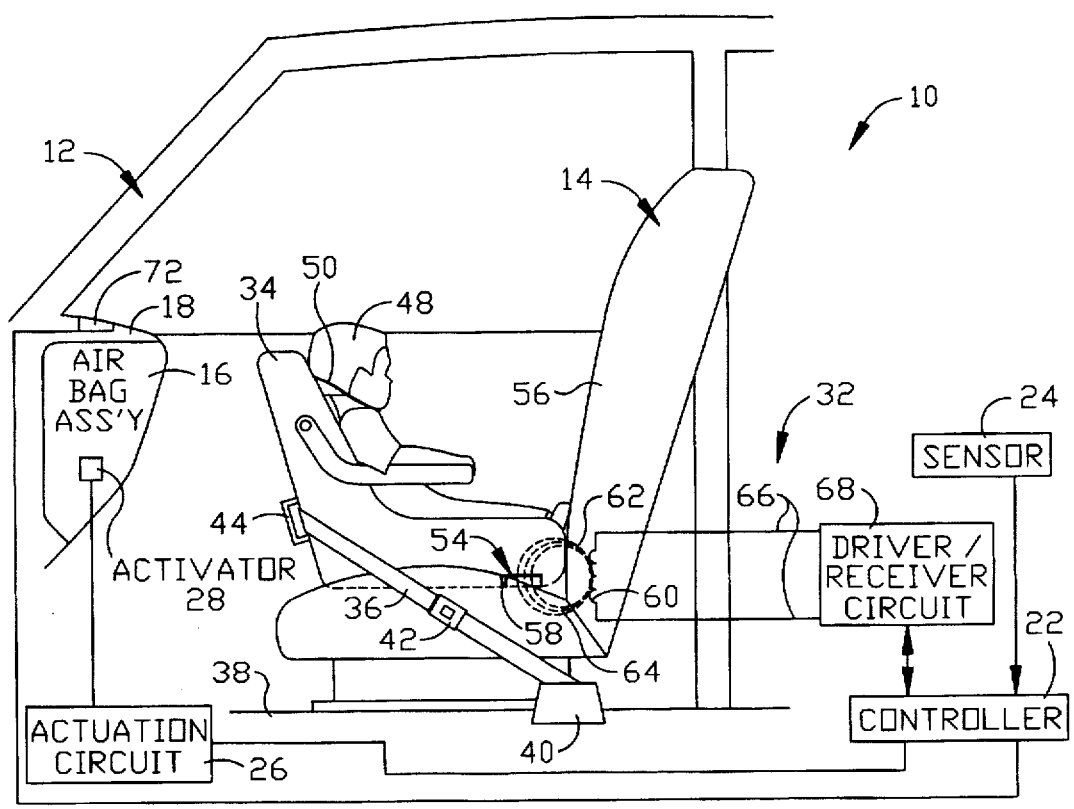
FIG. 1 is a schematic of an air bag restraint system including an apparatus made in accordance with the present invention.

An air bag restraint system 10 in a vehicle 12 is schematically shown in FIG. 1. The vehicle 12 includes a vehicle seat 14, which, for purposes of explanation, is a front passenger seat. An air bag assembly 16 is mounted in a dashboard 18 of the vehicle 12 in a manner well known in the art. An inflatable portion or air bag (not shown) of the air bag assembly 16 is inflated by means (not shown), such as an ignitable gas generating material and/or a container of pressurized gas, to extend into the occupant compartment of the vehicle 12 in front of the vehicle seat 14. The air bag assembly 16 may be any of several known air bag assemblies.

A controller 22 controls actuation of the air bag assembly 16 such that the air bag is inflated upon the occurrence of a condition indicative of a vehicle collision. A sensor 24 is mounted in the vehicle 12 and is operatively connected to the controller 22. The sensor 24 may be any of several known sensors, including an inertia switch or an accelerometer, that provide an electrical signal to the controller 22 upon the occurrence of a vehicle collision.

The controller 22 is controllably connected to an air bag actuation circuit 26. The air bag actuation circuit 26 is electrically connected to an activator 28 within the air bag assembly 16. The activator 28 may be any suitable mechanism for initiating the inflation of the air bag by an inflator of the air bag assembly 16. For example, the activator 28 may be a squib which is operatively coupled to the inflator.

During operation of the vehicle 12, the controller 22 monitors the signal provided by the sensor 24. When the controller 22 detects the onset of a vehicle collision, the controller 22 provides a signal to the actuation circuit 26 to energize the activator 28. Energization of the activator 28 causes inflation of the air bag of the air bag assembly 16.

A child restraint seat 34 is secured to the vehicle seat 14 in a rearward facing direction by use of the seat belt system associated with the vehicle seat 14. A lap belt 36 of the seat belt system is fastened to a buckle 42 secured to the vehicle floor 38 through an anchor assembly 40. The lap belt 36 is received in a belt holder 44 of the child restraint seat 34 and is secured to the vehicle floor on the other side (not shown) through a retractor assembly (not shown), all well known in the art. A child 48 is secured in the child restraint seat 34 using an over-both-shoulders harness restraint 50, such as a three point harness restraint of the type where two over-the-shoulder belts fasten to a between-the-legs buckle. Such belt systems are typical for a child restraint seat.

An apparatus 32 of the air bag restraint system 10 effects operation of the controller 22 to prevent actuation of the air bag assembly 16 when the rearward facing child restraint seat 34 is secured on the vehicle seat 14. An identification tag 54 of the apparatus 32 is attached to the child restraint seat 34. The identification tag 54 is made of a highly permeable amorphous material that is reactive when subjected to an oscillating electromagnetic (hereinafter referred to as "EM") signal having a particular frequency. Preferably, the identification tag 54 also includes a permanent magnet portion 58 that biases the amorphous material at the "knee" of a "BH" curve of the amorphous material.

As is known by those skilled in the art, the "BH" curve of the amorphous material is a plot of the magnetic flux density B as a function of the magnetic field intensity H. The "knee" of the "BH" curve is the region of the curve where the amorphous material exhibits a non-linear permeability. As a result of its bias at the non-linear "knee" of its BH curve, the amorphous material of the identification tag 54 vibrates when the material is placed in an EM signal of at least a minimum field strength, i.e. the material is magnetostrictive. The frequency of the oscillation of the amorphous material is referred to as the natural resonant frequency of the identification tag 54.

Preferably, the identification tag 54 is secured to the child restraint seat 34 with adhesive or is molded into a plastic portion of the child restraint seat during the seat's manufacture. In accordance with the embodiment shown in FIG. 1, the identification tag 54 is secured to the child restraint seat 34 such that, when the child restraint seat is secured in the rearward facing position on the vehicle seat 14, the identification tag is relatively near to a back portion 56 of the vehicle seat.

The apparatus 32 includes an antenna 60. The antenna 60 transmits an EM field or signal 62, hereinafter referred to as the EM transmit signal, which permeates the space surrounding the antenna. An electrical transmit signal is applied to the antenna 60 via electrical leads 66 to excite the antenna to transmit the EM transmit signal 62. The antenna 60 also receives any EM return signal generated by the identification tag 54 in response to actual EM return fields or signals. The electrical return signal appearing across the antenna 60 and "seen" by the receiver portion of circuit 68 is therefore a combination of the electrical transmit signal and EM return signals.

The amorphous material of the identification tag 54 oscillates when the identification tag is placed in the near field 62 of the antenna 60. The oscillating material of the identification tag 54 provides an EM return signal 64 which permeates the space surrounding the identification tag. Since the strength of both the EM transmit signal 62 from the antenna 60 and the EM return signal 64 from the identification tag 54 diminishes quickly as a function of the distance from the identification tag or the antenna e.g., at least as rapidly as the distance is squared and more so for larger wavelength signals, the distance between the antenna and the identification tag is important.

There are three possible cases of interaction between an identification tag and an antenna. The first case is when an identification tag is very near to an antenna. An EM transmit signal from the antenna has sufficient strength to excite the identification tag, and the identification tag stores sufficient energy to provide an EM return signal of sufficient strength to excite the antenna. Accordingly, the identification tag can be detected.

The second case is when an identification tag is somewhat near to an antenna. An EM transmit signal from the antenna has sufficient strength to excite the identification tag, but the identification tag does not store sufficient energy to provide an EM return signal of sufficient strength to excite the antenna. Accordingly, the identification tag cannot be detected.

The third case is when an identification tag is distant from an antenna. An EM transmit signal from the antenna does not excite the identification tag, and the identification tag does not provide an EM return signal. The identification tag cannot be detected.

Accordingly, the identification tag 54 is located on the child restraint seat 34 and the antenna 60 is located within the vehicle, e.g., within the back portion 56 of the vehicle seat 14, such that very little distance separates the identification tag from the antenna when the child restraint seat is located in the rearward facing position on vehicle seat 14. Specifically, the distance between the identification tag 54 and the antenna 60 must be less than a predetermined distance to ensure that the EM transmit signal 62 transmitted by the antenna 60 is strong enough to cause oscillation of the identification tag and storage of sufficient energy by the identification tag to provide the EM return signal. It is to be understood that the location of the identification tag 54 on the child restraint seat 34 and the location of the antenna 60 may be changed so long as the position of the antenna 60 remains relatively near to the identification tag when the child restraint seat is in the rearward facing position on the vehicle seat 14. Further, it is to be understood that the antenna 60 may be located elsewhere within the vehicle 12 other than within the vehicle seat 14. Also, the positions of the antenna 60 and identification tag 54 are such that, if the child restraint seat 34 were secured in a forward facing direction, the signal strength from the antenna 60 would not effect a reaction from the identification tag.

The apparatus 32 includes a driver/receiver circuit 68 that is operatively connected to the antenna 60 via the leads 66 and is also operatively connected to the controller 22. The driver/receiver circuit 68 provides the electrical transmit signal to the antenna 60 via the leads 66 such that the antenna transmits the EM transmit signal 62. The driver/receiver circuit 68 also receives the electrical return signal from the antenna 60. The driver/receiver circuit 68 further provides an electrical signal to the controller 22.

When a child restraint seat 34 is located in its rearward facing position on the vehicle seat 14, an EM return signal 64 will be received by the antenna 60. The EM return signal 64 will continue in time beyond the end of the EM transmit signal 62 for a predetermined interval. The driver/receiver circuit 68 senses the lingering EM return signal 64 and responds by providing a rearward facing child seat presence indicating signal to the controller 22. In response to the rearward facing child seat presence indicating signal generated by the driver/receiver circuit 68, the controller 22 disables the actuation circuit 26 such that the actuation circuit will not energize the activator 28 regardless of whether the sensor 24 provides a signal to the controller 22 indicative of a vehicle collision. Accordingly, the controller 22 prevents deployment of the inflatable portion of the air bag assembly 16 when the child restraint seat 34 is present and in the rearward facing position.

Also, the controller 22 may be controllably connected to a warning light 72 visibly mounted within the vehicle 12, such as on the dashboard 18. The warning light 72 will be readily visible to an operator (not shown) of the vehicle. When the controller 22 disables the actuation circuit 26 such that the activator 28 cannot be energized, the controller also causes the warning light 72 to be illuminated to notify the vehicle operator that the air bag assembly 16 associated with the location of the rearward facing child restraint seat 34 has been disabled.

Figure 2:
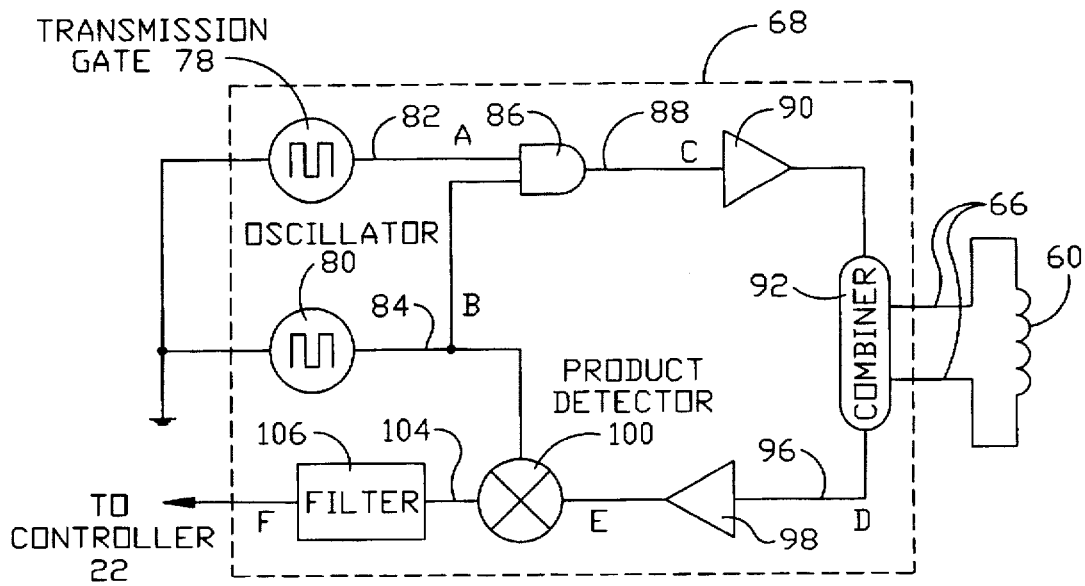
FIG. 2 is a schematic of the driver/receiver circuit shown in FIG. 1.
Figure 3:
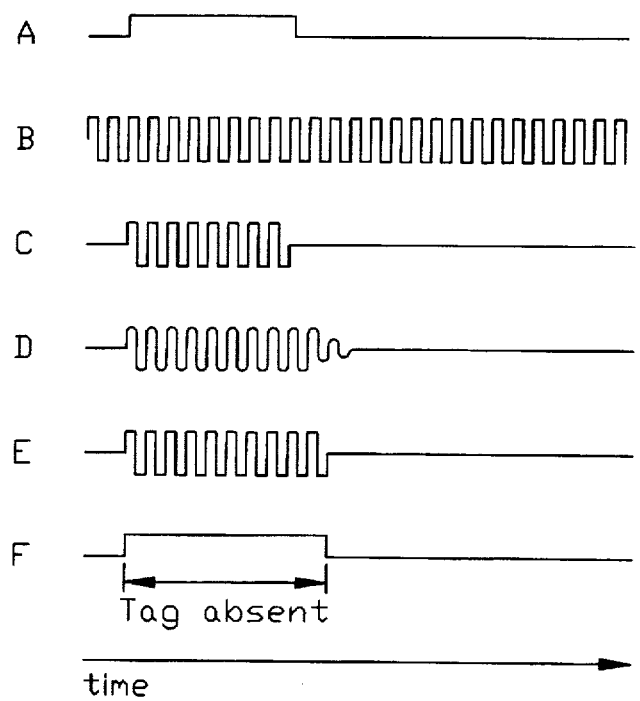
FIGS. 3 and 4 are graphical representations of electrical signals at several terminal locations of the driver/receiver circuit shown in FIG. 2.
Figure 4:
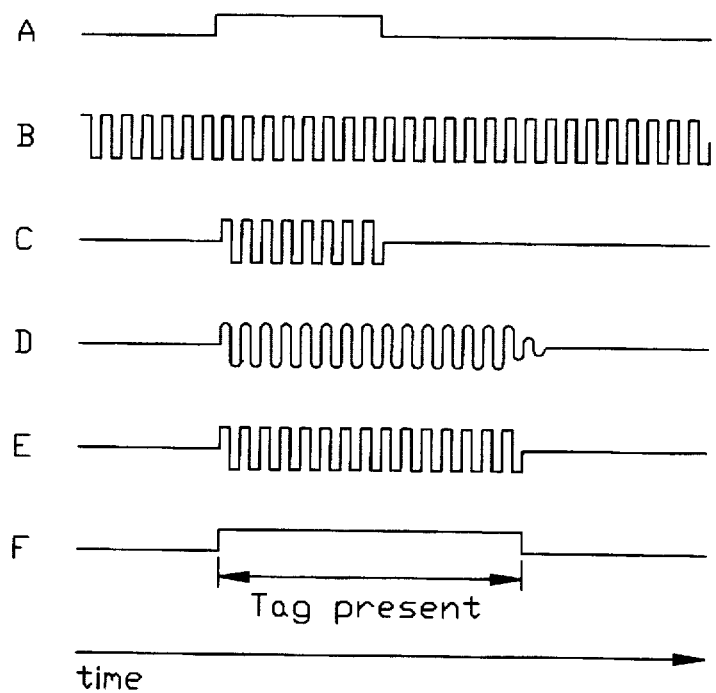

The driver/receiver circuit 68 (FIG. 2) includes a transmission gate signal generator 78 and a frequency oscillator 80. The transmission gate signal generator 78 provides an electrical signal "A" on an output line 82. Periodically, the signal "A" from the transmission gate signal generator 78 switches from a logic LOW to a logic HIGH, remains HIGH for a predetermined time, and then switches to LOW. The signal "A" from the transmission gate signal generator 78 is represented by trace A in FIGS. 3 and 4. FIG. 3 shows six alphabetically identified traces representing electrical signals appearing at locations within the driver/receiver circuit 68 (FIG. 2) identified by corresponding letters of the alphabet. The signals shown in FIG. 3 represent the situation in which the rearward facing child restraint seat 34 (FIG. 1) and the associated identification tag 54 are not present. FIG. 4 shows six similar traces for the situation in which the child seat and tag are present and the child seat is rearward facing.

The oscillator 80 (FIG. 2) provides an electrical signal on its output line 84 which is a continuous oscillating square waveform (logic HIGH and logic LOW) having a predetermined frequency. The frequency is predetermined to be the same as the natural resonant frequency of the identification tag 54. In one preferred embodiment, the frequency is 60 kHz. The signal at 84 is represented by trace B in FIGS. 3 and 4. In a preferred embodiment, the transmission gate signal generator 78 provides its output signal A to be synchronous with the output signal B from the oscillator 80.

Signals A and B (FIG. 2) are supplied to input terminals of an AND gate 86. In one embodiment, a single AND gate is used because the signals A and B are synchronous. If the signals A and B are not synchronous, additional synchronizing logic would be necessary. The signal on the output line 88 of AND gate 86 is an oscillating square waveform when signal 82 is HIGH, and is continuously LOW when the signal A on input line 82 is LOW. The signal at 88 is represented by trace C in FIGS. 3 and 4. Output signal C of the AND gate 86 is amplified by an amplifier 90.

The output of amplifier 90 is connected to a combiner circuit 92. The combiner 92 is connected to the antenna 60 by the leads 66. The amplified signal from the AND gate 86 is the electrical transmit signal. The combiner 92 imposes the electrical transmit signal (trace C, FIGS. 3 and 4) on the antenna 60 (FIG. 1), causing the antenna to transmit the EM transmit signal 62 with the same frequency as the oscillator 80 (trace B in FIGS. 3 and 4).

The antenna 60 provides the electrical return signal, which is represented by the trace D in FIGS. 3 and 4. If the child restraint seat 34 is not in the rearward facing position on the vehicle seat 14, then no identification tag 54 is present in the near EM field 62 of the antenna 60 and hence no EM return signal 64 is generated. Accordingly, only the electrical transmit signal is present on the leads 66 of the antenna 60. Combiner 92 extracts this signal and supplies it to line 92 as the electrical return signal. When the electrical return signal results from the electrical transmit signal alone, appearing as a "return" signal, the electrical return signal has the form shown by trace D in FIG. 3.

If the identification tag 54 is present, the EM transmit signal 62 (FIG. 1) causes the amorphous material of the identification tag to resonant at the same frequency as the EM transmit signal 62 (i.e., the natural resonant frequency). The resonating amorphous material of the identification tag 54 provides the EM return signal 64 having the same frequency as the frequency of the EM transmit signal 62. The EM return signal coupled from the antenna 60 to the line 96 by combiner 92 now includes not only the electrical transmit signal but also the actual EM return signal 64 from the identification tag 54. Hereinafter, the EM return signal 64 from the identification tag 54 is referred to as "the EM tag return signal 64", and the electrical signal provided by the antenna 60 when the antenna receives the EM tag return signal 64 is referred to as "the electrical tag return signal." When the EM tag return signal 64 from the identification tag 54 is received by the antenna 60, in addition to the electrical transmit signal, the electrical tag return signal has the form shown by trace D in FIG. 4.

The identification tag 54 provides the EM tag return signal 64 during the time that the EM transmit signal 62 permeates the space around the identification tag. The capability of the identification tag 54 to store EM energy in a mechanical form causes the tag to continue to provide the EM tag return signal 64 for a period of time after the EM transmit signal 62 transmitted by the antenna 60 terminates. Accordingly, when the identification tag 54 is present, the EM tag return signal 64 continues past the termination of the EM transmit signal 62 by a certain amount of time.

The electrical return signal from the antenna 60 is coupled to the output line 96 by the combiner 92. The output signal D on line 96 is input into an amplifier/limiter 98 (FIG. 2), which amplifies and limits the electrical return signal so as to form it into a square wave. The output of amplifier/limiter 98 is represented by trace E in FIGS. 3 and 4.

A mixer or product detector 100 multiplies the amplified and limited return signal (trace E, FIGS. 3 and 4) by the signal on output line 84 (trace B) of oscillator 80. Specifically, the product detector 100 performs product detection or quasi-synchronous product detection on its two input signals (traces B and E).

The product of the multiplication within the product detector 100 is a steady-state LOW when the electrical return signal (trace E) from the antenna 60 is a LOW and is a HIGH pulse when the electrical return signal from the antenna is synchronously oscillating with the signal from the oscillator 80 (trace B). The product detector 100 provides an electrical output signal 104 which is the result of the multiplication.

Output signal 104 is input into a low-pass filter 106 which removes unwanted noise components that may be present (none present in the illustrated embodiment). If high frequency noise of sufficient strength was present, the signal would have a chopped appearance. The chopping would be removed by the filter 106. The overall process performed by the signal processing chain may be referred to as direct conversion.

The output of filter 106 is represented by trace F in FIGS. 3 and 4 and is connected to controller 22. The controller 22 calculates the duration of each pulse in the filtered output signal 104 from the product detector 100 and determines when a rearward facing child seat is present by noting the duration of the HIGH pulse. The controller prevents the actuation circuit 26 from activating the activator 28 when the duration indicates that a rearward facing infant seat is present.

During operation, the oscillator 80 provides its continuous square waveform electrical signal (trace B), and the transmission gate signal generator 78 provides its signal (trace A). The electrical signal from the transmission gate signal generator 78 (trace A) periodically switches to a HIGH. When the AND gate 86 receives the HIGH from the transmission gate signal generator 78, the AND gate provides the oscillating electrical transmit signal which has the same frequency as oscillator 80 and a duration equal to the HIGH signal from the transmission gate signal generator 78. The electrical transmit signal is applied to the antenna 60 and the antenna transmits the EM transmit signal 62.

If the child restraint seat 34 is not present in the rearward facing position on the vehicle seat 14, then the identification tag 54 is not located within the near field 64 of the antenna 60. The EM transmit signal 62 is therefore either not received by the identification tag 54 at all, or is received with insufficient strength to cause the identification tag to resonate. Accordingly, the identification tag 54 does not provide an EM tag return signal 64. The electrical return signal (trace D, FIG. 3) produced by the antenna 60 thus lasts only for the time period beginning with the excitation of the antenna by the electrical transmit signal from the AND gate 86 and terminating after the antenna "rings down". The "ringing down" of the antenna 60 is represented by the portion of the trace D (FIG. 3) which continues to indicate an oscillation after the trace C returns to a steady state LOW.

The antenna 60 "rings down" quickly because the antenna 60 has a relatively low Q-factor. The traces of the various electrical signals within the driver/receiver circuit 68 have the durations as represented in FIG. 3. Specifically, the filtered HIGH output from the product detector 100 (trace F, FIG. 3) has a predetermined, relatively short, duration and is identified by the text "Tag absent".

The driver/receiver circuit 68 provides the filtered output signal (trace F) from product detector 100 to the controller 22. The controller 22 responds to a HIGH valve of a predetermined time duration in the filtered output signal and determines whether to disable the actuation circuit 26. The relatively short duration HIGH provided in the filtered output signal when the child restraint seat 34 is not present in the rearward facing position has a shorter duration than the predetermined time and thus the controller 22 does not disable the actuation circuit 26. If a vehicle collision occurs, the controller 22 will control the actuation circuit 26 to cause actuation of the air bag assembly 16.

When the child restraint seat 34 is in its rearward facing position on the vehicle seat 14, the tag will be situated in proximity to the antenna 60 and within its nearfield RF radiation pattern. The EM transmit signal 62 transmitted by the antenna 60 thus causes the identification tag 54 to resonate and generate the EM tag return signal 64. Accordingly, in addition to "ringing" of the antenna 60 due to its excitation from the electrical transmit signal, the antenna is subjected to the EM tag return signal 64 from the identification tag 54. The antenna 60 continues to receive an oscillating electrical tag return signal (trace D, FIG. 4) subsequent to the known "ring-down" time of the antenna. The EM tag return signal 64 continues for a predetermined time beyond the termination of the EM transmit signal 62. The predetermined time is relatively long because of the high Q factor of the identification tag 54.

When the rearward facing child restraining seat 34 is present, the electrical signals within the driver/receiver circuit 68 have the shapes and duration as shown in FIG. 4. Traces A–C in FIG. 4 are identical to traces A–C in FIG. 3. However, the oscillating portion of the electrical tag return signal (trace D, FIG. 4) has a relatively long duration (compared to trace D in FIG. 3). Also, the filtered HIGH output signal from the product detector 100 (trace F, FIG. 4) has a relatively long duration (compared to trace F in FIG. 3) and is identified by the text "Tag present". The HIGH output signal from the filter 106 lasts longer than when the child restraint seat 34 is absent or not located in a rearward facing position on the vehicle seat 14.

When the controller 22 receives an electrical output signal with the relatively long duration HIGH indicative of the child restraint seat 34 being present in the rearward facing position, the controller 22 controls the actuation circuit 26 to prevent activation of the activator 28. Thus, when the child restraint seat 34 is in the rearward facing position, the air bag assembly 16 is disabled and the warning light 72 is lit to warn the occupants.

From the above description of the invention, those skilled in the art will perceive improvements, changes and modifications. For example, different identification tags (i.e., on different child restraint seats) may have slightly different natural resonant frequencies. An identification tag which has a natural resonant frequency slightly different than the frequency of the oscillator 80 oscillates at the natural resonant frequency in response to the EM transmit signal 62 because of the non-linearity of the amorphous material. Accordingly, the electrical signals which are inputs to the product detector 100 have frequency components which are slightly different. As a result, the filtered output signal from the product detector 100 has a low frequency component which "chops" the HIGH value. The low frequency component can be removed from the product detector output signal before the output signal is supplied to the controller 22.

A peak detector or probe may be used to remove the low frequency chopping of the filtered output signal from the product detector 100. Specifically, the filtered output signal with the low frequency chopping is input to the peak detector, and the peak detector provides a steady state output without the low frequency component. The output of the peak detector is provided to the controller 22. Such improvements, changes and modifications within the skill of the art are intended to be covered by the appended claims.

Having described the invention, the following is claimed:

1. An apparatus for sensing the presence of an object having secured thereon identifier means providing an electromagnetic identifier return signal in response to a transmitted electromagnetic signal, said apparatus comprising:

transmitter means for providing a transmitted electromagnetic signal having a frequency and a time duration, said transmitted electromagnetic signal from said transmitter means causing the identifier means to provide the electromagnetic identifier return signal, the electromagnetic identifier return signal having substantially the same frequency as said transmitted electromagnetic signal and continuing in duration beyond said transmitted electromagnetic signal;

receiver means for receiving an electromagnetic identifier return signal from the identifier means; and processor means coupled to receive inputs from said transmitter means and said receiver means for determining the presence of the identifier means when said receiver means receives said electromagnetic identifier return signal and providing a signal indicative thereof.

2. An apparatus as set forth in claim 1 further including means to secure the identifier means to a child restraining seat.

3. An apparatus as set forth in claim 1, wherein said transmitter means includes a means for providing an oscillating electrical signal, said receiver means includes means for providing an oscillating electrical identifier signal responsive to the electromagnetic identifier return signal, wherein said processor means receives said electrical signals provided by said transmitter means and said receiver means as said inputs from transmitter means and said receiver means, and said processor means includes means for multiplying said electrical signals provided by said transmitter means and said receiver means.

4. An apparatus as set forth in claim 3, wherein said signal provided by said processor means has a duration longer than said transmitted electromagnetic signal when said identifier means is present.

5. An apparatus as set forth in claim 1, wherein the duration of the electromagnetic identifier return signal is longer than the duration of said transmitted electromagnetic signal.

6. An apparatus as set forth in claim 1, wherein said signal provided by said processor means has a steady state value when said identifier means is present.

7. An apparatus as set forth in claim 1, wherein said transmitter means and said receiver means include a single antenna means for transmitting said transmitted electromagnetic signal and for receiving said electromagnetic identifier return signal.

8. A method for sensing the presence of an object, said method comprising:

securing an identifier means to the object;

transmitting an electromagnetic signal having a frequency and a time duration;

providing an electromagnetic identifier return signal from the identifier means in response to the transmitted electromagnetic signal, the electromagnetic identifier return signal having substantially the same frequency as the transmitted electromagnetic signal and continuing past the transmitted electromagnetic signal;

receiving the electromagnetic identifier return signal;

processing the received electromagnetic identifier return signal using the transmitted electromagnetic signal; and determining the presence of the identifier means in response to the processed electromagnetic identifier return signal and providing a signal indicative thereof.

9. A method as set forth in claim 8, wherein the step of securing includes securing the identifier means to a child restraining seat.

10. A method as set forth in claim 8, wherein said step of processing the received electromagnetic identifier return signal includes multiplying electrical signals provided by a transmitter means and a receiver means.

11. An apparatus for sensing the presence of an object, said apparatus comprising:

signal means for providing an oscillating electrical transmit signal having a frequency and a duration;

antenna means for transmitting an electromagnetic signal for a time duration in response to said electrical transmit signal and for providing an electrical return signal in response to a received electromagnetic identifier return signal;

identifier means securable to the object for providing said electromagnetic identifier return signal in response to said transmitted electromagnetic signal, said electromagnetic identifier return signal having substantially the same frequency as said transmitted electromagnetic signal and continuing for a time duration past the termination of said transmitted electromagnetic signal; and processor means coupled to said signal means and said antenna means for synchronously multiplying said electrical transmit signal and said electrical return signal to produce an electrical resultant signal indicative of the presence of the identifier means.

12. An apparatus as set forth in claim 11 further including means to secure said identifier means to a child restraining seat.

13. An apparatus as set forth in claim 11 further including an amplifier/limiter for amplifying and limiting said electrical return signal from said antenna means.

14. An apparatus as set forth in claim 11, wherein said electrical transmit signal and said electrical return signal have the same frequency.

15. An apparatus as set forth in claim 11 wherein said electrical resultant signal has a steady state value for a time duration which is related to the presence of said identifier means.

16. An apparatus as set forth in claim 11, wherein said processor means further includes means for removing unwanted frequency components from said electrical resultant signal.

17. An apparatus as set forth in claim 16, wherein said means for removing unwanted frequency components includes a low-pass filter.

18. An apparatus for sensing the presence of an object having secured thereon identifier means providing an electromagnetic identifier return signal in response to a transmitted electromagnetic signal, said apparatus comprising:

transmitter means for providing a transmitted electromagnetic signal having a frequency, the transmitted electromagnetic signal causing the identifier means to provide the electromagnetic identifier return signal, said transmitter means including a source outputting an oscillating signal at the frequency of the transmitted electromagnetic signal;

receiver means for receiving an electromagnetic identifier return signal from the identifier means and for providing an electrical signal indicative of the electromagnetic identifier return signal; and processor means, coupled to receive the oscillating signal from said source and the electrical signal from said receiver means as inputs, for determining the presence of the identifier means when said receiver means receives the electromagnetic identifier return signal and for providing a signal indicative thereof, said processor means includes quasi-synchronous product detection means for multiplying the oscillating signal from said source and the electrical signal from said receiver means.

19. An apparatus as set forth in claim 18, wherein said processor means includes means for outputting a signal having a constant value for a time duration dependent upon the duration of the electrical signal from said receiver means.

20. An apparatus for sensing the presence of an object having secured thereon identifier means providing an electromagnetic identifier return signal in response to a transmitted electromagnetic signal, said apparatus comprising:

transmitter means for providing a transmitted electromagnetic signal, said transmitter means including oscillator signal means for providing an oscillating signal having a frequency, gate signal means for providing a gate signal having a pulse duration, AND gate means, coupled to receive the oscillating signal from said oscillator signal means and the gate signal from said gate signal means as inputs, for outputting a signal having the frequency of the oscillating signal from said oscillator signal means and having the duration of the gate signal from said gate signal means, and antenna means for outputting the transmitted electromagnetic signal having the frequency and duration of the signal output from said AND gate means, the transmitted electromagnetic signal causing the identifier means to provide the electromagnetic signal;

receiver means for receiving an electromagnetic identifier return signal from the identifier means and for providing an electrical signal indicative of the electromagnetic identifier return signal; and processor means for determining the presence of the identifier means when said receiver means receives the electromagnetic identifier return signal and for providing a signal indicative thereof, said processor means including multiplier means, coupled to receive the oscillating signal from said oscillator signal means and the electrical signal from said receiver means as inputs, for multiplying the oscillating signal from said oscillator signal means and the electrical signal from said receiver means, and means for outputting a signal having a pulse width duration dependent upon the duration that the electrical signal from said receiver means oscillates with the oscillating signal from said oscillator signal means.

21. An apparatus as set forth in claim 20, wherein said means for multiplying includes means for providing a positive sign value for the output signal when the sign values of the oscillating signal from said oscillator signal means and the electrical signal from said receiver means match.

* * * * *